(12) United States Patent
 Keller

(10) Patent No.: US 9,596,568 B1
(45) Date of Patent: Mar. 14, 2017

(54) CONTENT DISPLAY CONTROLS BASED ON ENVIRONMENTAL FACTORS

(71) Applicant: Amazon Technologies, Inc., Reno, NV (US)

(72) Inventor: Kevin E. Keller, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/983,375

(22) Filed: Dec. 29, 2015

Related U.S. Application Data

(63) Continuation of application No. 13/609,572, filed on Sep. 11, 2012, now Pat. No. 9,288,387.

(51) Int. Cl.
*H04N 5/232* (2006.01)
*H04W 4/02* (2009.01)
*H04B 1/3827* (2015.01)
*H04L 29/08* (2006.01)
*H04W 8/18* (2009.01)

(52) U.S. Cl.
CPC .......... *H04W 4/023* (2013.01); *H04B 1/3827* (2013.01); *H04L 67/18* (2013.01); *H04L 67/306* (2013.01); *H04W 8/183* (2013.01)

(58) Field of Classification Search
CPC ......... H04N 21/4223; H04N 21/44218; H04N 5/23219
See application file for complete search history.

(56) References Cited

U.S. PATENT DOCUMENTS

| 6,675,384 | B1* | 1/2004 | Block ............... H04N 7/06 348/E5.096 |
| 8,218,080 | B2* | 7/2012 | Xu ................... G06K 9/00221 348/552 |
| 8,798,323 | B2* | 8/2014 | Soderstrom ....... G06F 17/30241 382/104 |
| 2007/0126884 | A1* | 6/2007 | Xu ................... G06K 9/00221 348/220.1 |
| 2007/0213100 | A1* | 9/2007 | Osann, Jr. ........... H04M 1/6505 455/567 |
| 2008/0141293 | A1 | 6/2008 | Blanchard et al. |
| 2008/0160984 | A1* | 7/2008 | Benes ................. H04M 1/7253 455/419 |
| 2008/0235739 | A1* | 9/2008 | Coebergh Van Den Braak .......... H04N 5/782 725/86 |
| 2009/0285492 | A1* | 11/2009 | Ramanujapuram G06F 17/30247 382/209 |

(Continued)

*Primary Examiner* — Amy Hsu
(74) *Attorney, Agent, or Firm* — Polsinelli LLP

(57) ABSTRACT

Approaches are described for controlling and filtering the display of content by computing devices. In particular, a mobile computing device can adjust the playing of media content (e.g., audio, video, images, games, ringtones) according to situational appropriateness and other environmental factors occurring around the device. For example, a mobile computing device such as a smart phone could use image and audio information captured by its sensors to determine that minors are present within the vicinity of the mobile phone, and filter certain portions of media content that would be deemed inappropriate for those minors. The environmental information can be determined based on data gathered by various sensors of the mobile device, including but not limited to cameras, microphones, global positioning system (GPS) devices, light sensors and others.

16 Claims, 7 Drawing Sheets

(56) References Cited

U.S. PATENT DOCUMENTS

| | | | |
|---|---|---|---|
| 2010/0080414 A1* | 4/2010 | Nonaka | G06F 17/30265 382/100 |
| 2010/0130182 A1* | 5/2010 | Rosen | G06K 9/00785 455/414.1 |
| 2011/0141114 A1* | 6/2011 | Chen | G06F 3/012 345/428 |
| 2011/0237324 A1* | 9/2011 | Clavin | G06K 9/00369 463/29 |
| 2012/0071132 A1* | 3/2012 | Carlander | G06F 21/6218 455/411 |
| 2012/0280901 A1* | 11/2012 | Kim | G06F 3/017 345/156 |
| 2013/0130669 A1* | 5/2013 | Xiao | H04M 1/72572 455/418 |
| 2013/0157607 A1* | 6/2013 | Paek | G06F 1/1632 455/404.1 |

* cited by examiner

CONTENT DISPLAY CONTROLS BASED ON ENVIRONMENTAL FACTORS

CROSS-REFERENCE TO RELATED APPLICATIONS

This application is a continuation of U.S. patent application Ser. No. 13/609,572, filed on Sep. 11, 2012, the content of which is incorporated herein by reference.

BACKGROUND

In recent years, portable computing devices, such as tablets and smart phones, have been increasingly utilized by consumers for a number of different purposes. Besides making telephone calls and browsing websites on the Internet, these devices are often used to render media (e.g., audio and video), capture photographs, play games, manage personal tasks and perform a variety of other functions. In some cases, the portable device can be integrated with another device used to playback content, such as televisions, stereo equipment and the like. For example, a mobile phone may transmit digital audio (e.g., MP3 content) to a stereo system which can play the audio in higher sound quality than what the mobile phone could otherwise achieve. Similarly, the device may provide video or other image content to a television for display in the user's home. All of this increased integration presents opportunities to provide better, more tailored and granular control to the user over the various forms of content being displayed.

BRIEF DESCRIPTION OF THE DRAWINGS

Various embodiments in accordance with the present disclosure will be described with reference to the drawings, in which.

DETAILED DESCRIPTION

Figure 1:
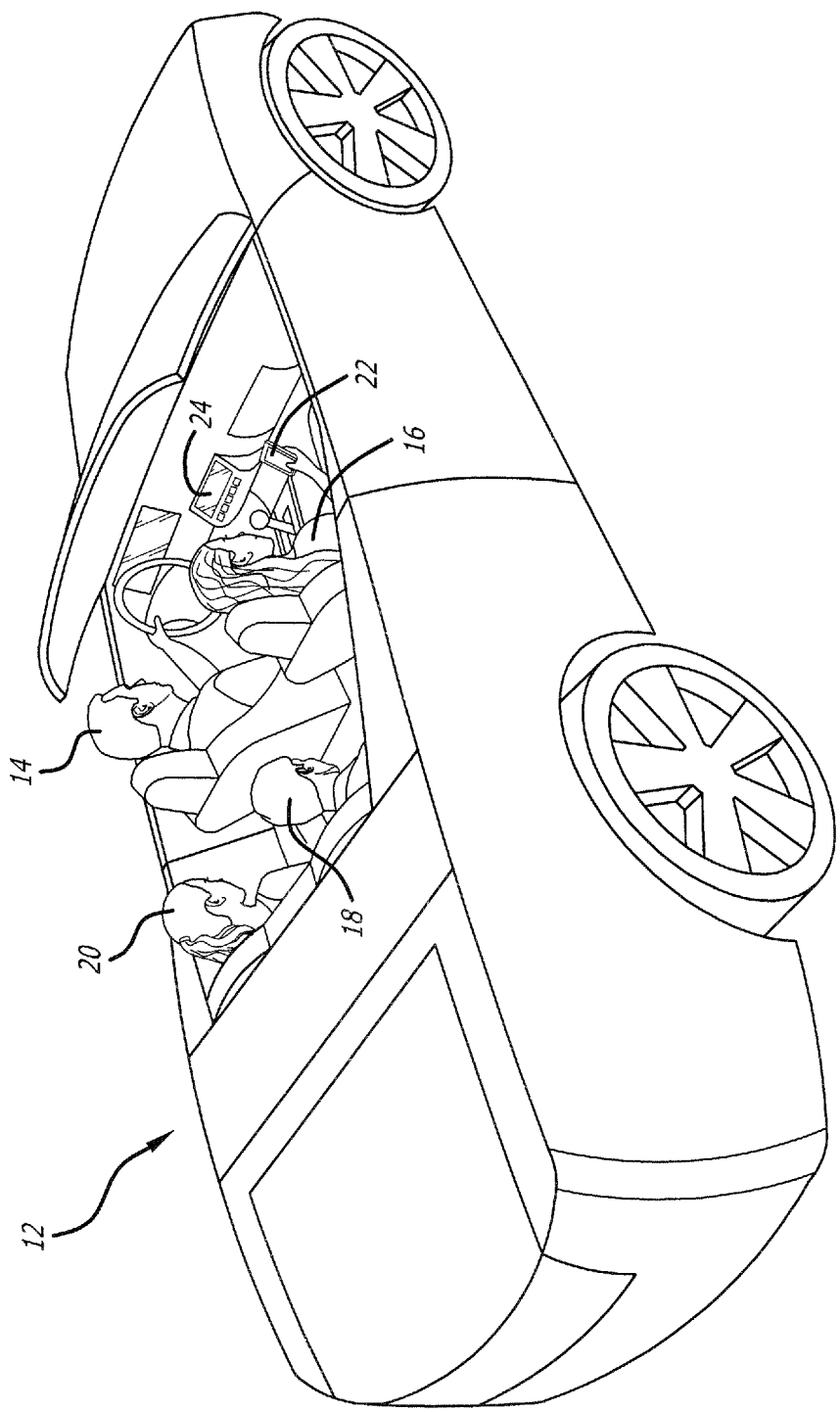
FIG. 1 illustrates an example of an environment in which the mobile computing device is used to control content presenting, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for displaying and otherwise presenting content via one or more computing devices. In particular, various embodiments provide approaches for filtering and otherwise controlling the presentation of content (e.g., audio, video, images, ringtones, games) by computing devices according to situational appropriateness and other environmental factors occurring around the device. For example, a mobile computing device such as a smart phone could use image data and/or audio information captured by its sensors to determine that minors are present within the vicinity of the mobile phone, and filter certain portions of media content that would be deemed inappropriate for those minors. The environmental information can be determined based on data gathered by various sensors of the mobile device, including but not limited to cameras, microphones, global positioning system (GPS) devices, light sensors and others.

In some instances, instead of directly presenting the content, the mobile device (e.g., mobile phone) can provide the media content to another device for presentation while still controlling one or more aspects of the content. By way of example, the mobile phone may establish a connection with a stereo system of an automobile and use the stereo system to play music or other audio inside the automobile. While playing the music tracks, the device may determine that a child is present in the car and that the next song in the playlist includes profanity or other inappropriate material. For example, the mobile phone can use one or more cameras embedded therein to identify that an adult is with a child and then either skip the song in the playlist or filter the inappropriate material from the song. In various embodiments, the device can briefly turn off the audio during the moments of profanity, "bleep out" the swear words, or otherwise censor the inappropriate material. The amount of filtering could be adjusted as the device recognizes various people in a family, perhaps applying more filtering for a 5 year old child than a 13 year old teenager, based on a set of parental rules. In some embodiments, the parental rules can be configurable by the owner of the device (e.g., parent).

By way of another example, when video is being played on the device or through a HDMI connection to a screen, the display can be adjusted by using overlays to remove swearing or adult scenes when a child is in the room (or just during the period of time that the child walks into the room). In some embodiments, the underlying content does not need to be modified. Instead, one or more filters can be applied that skip over certain portions of scenes, substitute audio over swear words or otherwise censor the content portions.

In some embodiments, the device can switch to different modes based on contextual clues such as identified persons in proximity of the device. For example, the device may switch into an "accessibility" mode if the user is recognized as someone who is disabled, older or otherwise would benefit from those features. The accessibility mode may cause the device to display larger icons, provide audio information or receive audio instructions from the user, among other such options. Similarly, the device may determine that the person may need easier accessibility mode if the user is having trouble hitting obvious touch points to execute certain functionality that would typically be the primary focus of those who did not need the accessibility features. In various embodiments, a number of other modes each associated with specific functionality, can also be implemented for use with the device, such as a child mode, specific disability modes (blind, deaf, etc.), public mode, quiet mode and the like.

Aside from recognizing persons present in the vicinity of the device, the computing device can use other environmental information to modify and control the presentation of content. The presentation of content can include displaying one or more images or one or more videos, playing one or more audio files and presenting any other media content. For example, the mobile computing device can learn that a certain location is a work environment and adjust ringtones, images or other content displayed by the device so that inappropriate material is not displayed in the workplace of the user. This can also be performed based on environmental attributes other than location information. In environments where location data isn't available, the computing device may use contextual clues about the environment, including but not limited colors, shapes or types of objects identified by images captured using a camera of the device, identified persons within proximity of the device, and the like. For example, it may be useful for the mobile phone device to modify a ringtone if the user is determined to be out to dinner with work colleagues. In this embodiment, the device could automatically recognize that the persons in proximity of the device are identified as work colleagues and determine that existing rules about "work" should still apply, despite the fact that the device is not in the work "location" anymore. Based on that determination, the device could automatically change the ringtone, without the user having to remember to manually change it themselves. In some embodiments, the content can also be secured so that any third party who picked up an unlocked device would only be able to access limited content that was appropriate for a general audience. All work-related e-mail, personal documents, and other sensitive information can be made inaccessible to the third party. In this embodiment, the user interface can revert to generic unless the owner of the device is identified and overrides the generic mode.

In various embodiments, the device can perform image analysis on data received from one or more cameras to identify one or more persons in the room. For example, the device can apply facial recognition algorithms to images of a user when attempting to recognize the user. The device could also use multiple cameras to obtain depth information which can be used to determine distance to various objects or persons. For example, the device can use image information captured by multiple cameras to determine that someone other than the typical user was within viewing distance such that they could read over the user's shoulder. Based on that determination, the device can perform a number of actions, such as dimming the screen, blocking or filtering content that may have been designated private, or notifying the user to inform them that their information is at risk. Distance information can be determined by configuring two or more cameras for stereo image processing. When multiple cameras are used, distance information in the image can be determined by comparing the offset in the image with the known distance between the two cameras embedded in the device. This distance information can be used for a variety of purposes, including the ability to determine when third party persons are within viewing distance of the device, as described above. In some embodiments, the device can further analyze the audio information captured by a microphone to identify one or more users that are speaking in the room. For example, one or more voice recognition algorithms can be applied by the device to identify or authenticate the user based his or her voice patterns (e.g., pitch, timber). In at least one embodiment, the device can store a voiceprint or other unique information for each user in the family and associate the voiceprint with known user characteristics, such as age, sex, taste or preferences and the like.

In some embodiments, the mobile computing device or a fixed device in a room, (e.g., a set top box, streaming media device, etc.) can allow the users to specify preferences for various types of content that would be rendered by the mobile device. For example, one user may indicate that they do not like a particular song and the mobile device can skip over that song in the playlist whenever that user is in the room. These preferences can be manually configured using the interface of the device or can be automatically obtained from another location, such as a different computing device, or the like. In one embodiment, the device can use audio and imaging data captured by its sensors to identify all of the users in the room (or other environment) and selectively control the content being presented according to the users currently in the vicinity.

FIG. 1 illustrates an example of an environment in which the mobile computing device is used to control content presentation, in accordance with various embodiments. In the illustrated embodiment, an automobile 12 is shown with two adults (14, 16) sitting in the front seat and two children or teenagers (18, 20) sitting in the rear seat. The passenger adult 16 is holding a mobile computing device 22, such as a cellular phone. The mobile computing device 22 can establish a connection with the stereo system 24 of the automobile and use the stereo system 24 to play various media content (e.g., music) to the persons in the car. The connection can be either a wired connection (e.g., RCA cable) or a wireless connection (e.g., Bluetooth, RF) through which the mobile device 22 can relay the audio information to the stereo system 24.

In accordance with an embodiment, the mobile computing device 22 can use data gathered by its various sensors to determine that the persons in the automobile include children or minors (18, 20). For example, the mobile device can use image data captured by the front-facing and rear-facing cameras to identify the persons present in the vehicle using various facial recognition techniques. As an alternative example, the mobile device can use audio information captured by a microphone embedded in the device to identify the persons based at least in part on voice recognition software. In addition, the device may use other information gathered by its various sensors to determine attributes about its environment, including GPS information to determine that the device is in an automobile (i.e. traveling fast), information indicating that a connection has been established with the stereo system of the automobile, and the like, in order to evaluate the environment in which the device is currently in. In some embodiments, the mobile device may obtain some of the environmental information by establishing communication with the computing system of the automobile itself. For example, the main computer of the automobile may contain information indicating that there are persons in the backseat weighing less than 70 lbs. (e.g., children) or other useful environmental information which could be provided to the device.

In accordance with an embodiment, the mobile computing device 22 controls the rendering of the media content based at least in part on the determined environmental attributes, such as the presence of children within the automobile, as illustrated in FIG. 1. For example, if the mobile device 22 is playing a playlist that is audible to the children (18, 20) sitting in the backseat, the device 22 may skip the songs in the playlist that contain profanity, sexual references or other explicit material that the parents may have deemed inappropriate for their children. Alternatively, the mobile device may apply one or more filters that silence or "bleep" the inappropriate material in the audio track. The song may be determined to contain the inappropriate material based on various ratings, such as the parental advisory (PAL) label associated with the song in the playlist.

In some embodiments, the amount or degree of filtering can be adjusted based on the specific persons that have been identified to be present within the automobile. For example, if the mobile device determines that there is a 5 year old present in the automobile, the device may entirely skip certain audio tracks, while if the child is 13 years old, the device may simply censor the portions containing the profanity.

In accordance with an embodiment, the controlling and filtering of the media content is configurable on the mobile device. For example, the device can be installed with an application that manipulates the various settings for the media content that will be displayed for the device. In some embodiments, the device can store profiles (e.g., voiceprints, facial features, body attributes) of various users known by the owner of the device, such as the family members. The device can use these profiles to later identify which persons are present in the environment around the mobile device and adjust the display of content according to these persons. In some embodiments, the device may further include a default profile for strangers (i.e. people that are not able to be identified by the device) which specifies how content is to be rendered with strangers present in the vicinity of the device.

Figure 2:
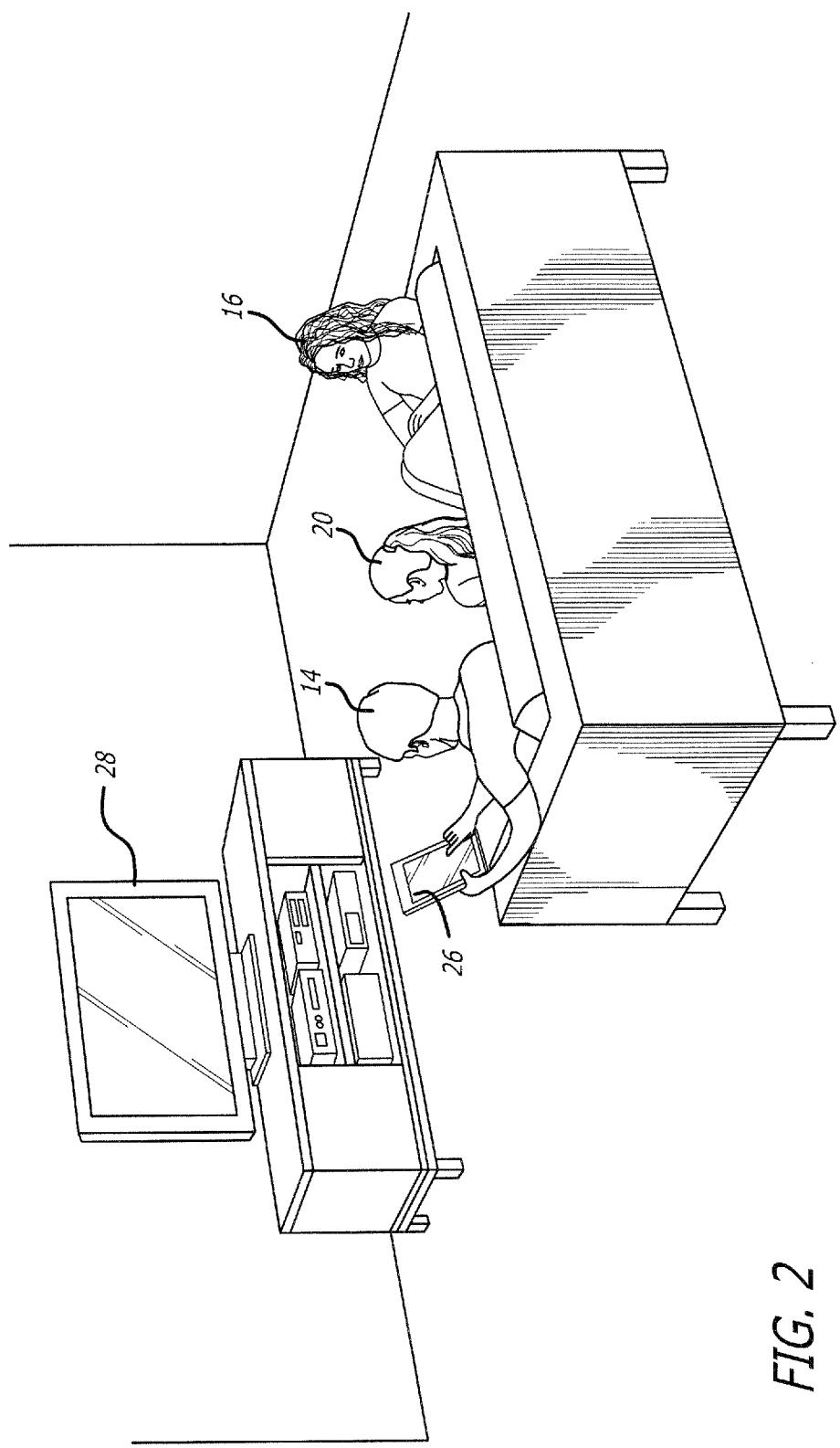
FIG. 2 is an illustration of another environment in which a mobile computing device can control the presenting of media content, in accordance with various embodiments.

FIG. 2 is an illustration of another environment in which a mobile computing device can control the presenting of media content, in accordance with various embodiments. It should be understood that throughout this disclosure, reference numbers for like components may be carried over between figures for purposes of explanation, but this should not be interpreted as limiting the scope of the various embodiments.

In the illustrated embodiment, an environment of a living room is shown with several persons sitting on a couch in front of a television 28. Similarly to the previous figure, the persons include parents (14, 16) and a child 20 sitting within a predetermined vicinity of the mobile device 26. In this example, the mobile device 26 is a tablet computer that is being handheld by the parent 14. For example, the parent 14 may be using the device 26 to display media content, such as video or multimedia. In one embodiment, the video may be displayed by the device transmitting the video to the television 28 in order to provide a larger display area.

In accordance with an embodiment, the device 26 can detect the presence of the child 20 within the vicinity of the device. The vicinity can be any predetermined area around the device, such as area within audible or viewable distance of the device 26 (or television 28), area within the same room or other physical location as the device 26, or a specified distance away from the device 26. In various embodiments, the device can use data received from the camera, microphone, GPS device or other location sensor, light sensor, or other sensor embedded in the device.

In accordance with an embodiment, the device 26 may analyze the information retrieved from the various sensors and control or adjust the playback or display of video or other media content by the device. For example, the device may use overlays to remove swearing or adult scenes from the video content as long as the child 20 is sitting within viewing distance of the display. Alternatively, the device 26 may display a warning to the person 14 operating the device, indicating that an explicit scene may be coming up which may be inappropriate for the child in the room. In some embodiments, once the child exits the room, the device can automatically adjust the display of media content to cease overlaying the adult scenes.

Figure 3:
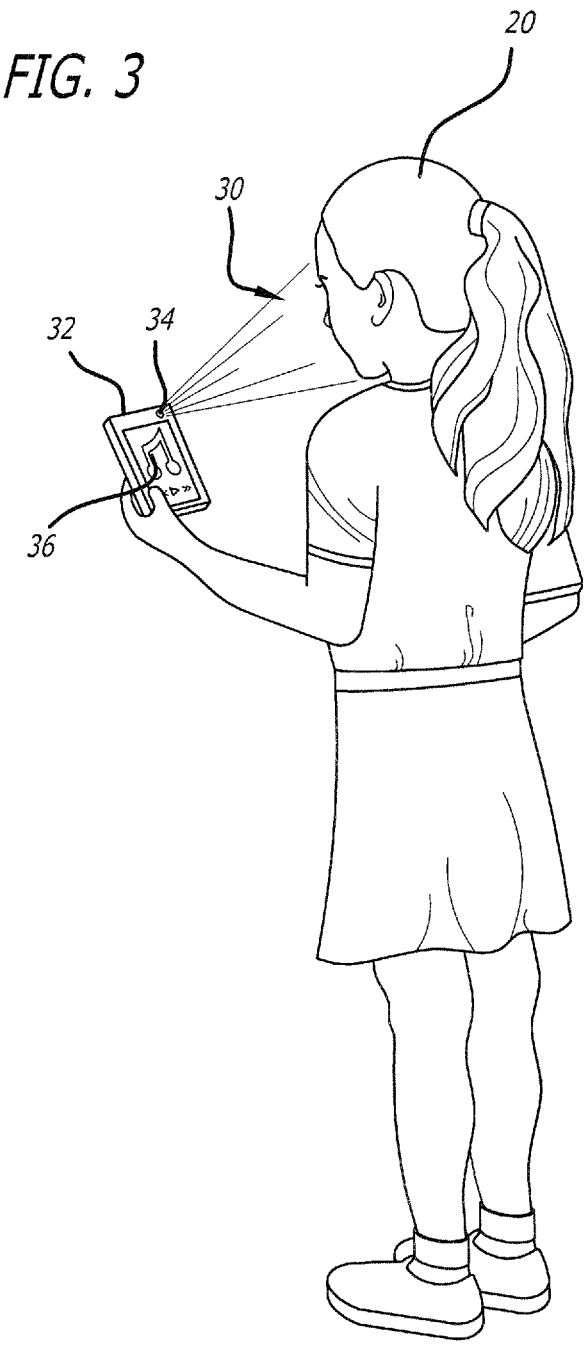
FIG. 3 illustrates an example of a mobile computing device that uses facial recognition to control the display of media content, in accordance with various embodiments.

FIG. 3 illustrates an example of a mobile computing device that uses facial recognition to control the display of media content, in accordance with various embodiments. In the illustrated embodiment, the child 20 is operating the mobile device 32 in order to play music or other audio. This may be performed by the child 20 using the touch screen 36 to select and play the songs from a playlist which are appealing to her. In some cases, the songs or other content may have a parental advisory label or other metadata indicating that the music contains inappropriate material.

In accordance with an embodiment, the device 32 may use the front-facing camera 34 to capture an image 30 of the user 20 using the device. The device can then apply some image recognition and facial recognition algorithms to identify the user that is currently operating the device 32. Facial recognition, as well known in the art, can be any software and/or hardware to identify or verify a person from a digital image or video frame, such as by comparing a number of features extracted from the image against a database of other features. In this particular example, the facial recognition application may match the user 20 to a stored profile of the child 20 which may have been configured by the parent owner of the device. In other embodiments, however, the device may analyze the facial features of the user 20 in order to determine or estimate the approximate age of the user.

In accordance with the illustrated embodiment, the device 32 can then control, filter and otherwise modify the playing of the media content (e.g., music, video, images) based on the identification of the user. For example, because the user 20 may be identified as being a young child, the device 32 may sensor various obscene material from the music or video being displayed by the device.

In various embodiments described herein, besides identifying persons in the vicinity of the device, the mobile computing device can also utilize the data captured by its sensors to determine a variety of other information about the physical environment around the device. For example, the device can utilize GPS information to determine that the device is at the user's work environment and therefore restrict the presentation of various content in response to that determination. Alternatively, the device may simply determine that the device is in a public location (e.g., restaurant, bar, shopping area) and control the presentation of content accordingly. In some embodiments, the user may configure the settings of the device to create profiles (e.g., a profile for public locations, a profile for home environment, a profile for work environment, etc.). Each profile can indicate what types of content should be restricted, filtered or otherwise controlled by the mobile device. For example, the user may wish for the mobile device to play different ringtones or turn off the sound of the device when the device is in the work environment versus the home environment.

Figure 4:
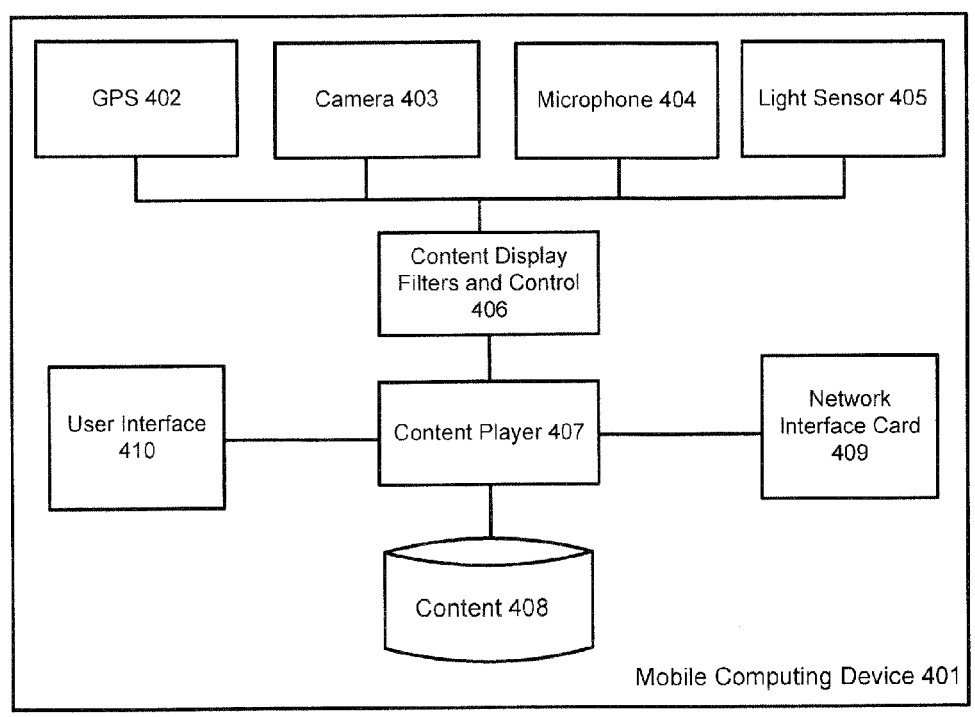
FIG. 4 illustrates an example of various components of the mobile computing device that can be used to control the display of media content, in accordance with various embodiments.

FIG. 4 illustrates an example environment 400, showing various components of the mobile computing device that can be used to control the display of media content, in accordance with various embodiments. In the illustrated embodiment, the mobile computing device 401 contains a number of sensors, including a global positioning system (GPS) receiver 402, a camera 403, a microphone 404, and a light sensor 405. A GPS receiver 402 can receive GPS signals for the purpose of determining the device's current location on Earth. The GPS device can provide latitude, longitude, and in some cases altitude information to the computing device 401. The camera 403 can be any device capable of capturing images or sequences of images (i.e. video). For example, a digital camera 403 embedded into a mobile phone is typically comprised of a lens positioned in front of an image sensor that converts the optical image into electronic signal. The microphone 404 can be any device capable of converting sound into an electrical signal. The light sensor 405 can be a photoresistor or any other device capable of detecting light or other electromagnetic energy.

In various embodiments, the mobile computing device 401 can further include a content display filter and control component 406 and a content player 407 capable of displaying media or other content 408. The content player 407 can be any media player or other software or hardware that is capable of rendering content to a person. In accordance with an embodiment, the content filter and control component 406 can use some or all of the data gathered by the sensors (402, 403, 404, 405), as well as other data, in order to determine one or more factors about the environment within the vicinity of the device. For example, the mobile device can use a combination of image data captured by the camera 403, sound captured by microphone 404 and location information provided by the GPS receiver 402 in order to determine that the device is currently in the living room in which one or more children are present, as previously illustrated. Based on the analysis of this data, the content filter 406 can adjust the display of the content being played by the content player 407. For example, the filter 406 may censor at least a portion of audio or video being displayed, skip over the portion or otherwise adjust the rendering of the content 408.

In various embodiments, the content being displayed by the device 401 can either be stored locally 408 on the device, or obtained from a remote location over a network, such as by using a network interface card 409. For example, the device may stream content from the "cloud" content provider that provides movies, music or other media content over a network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. In addition, the content being rendered by the content player 407 can be displayed on a user interface 410 of the device, transmitted to a remote device (e.g., stereo, television) or presented in some other manner as known in the art.

Figure 5:
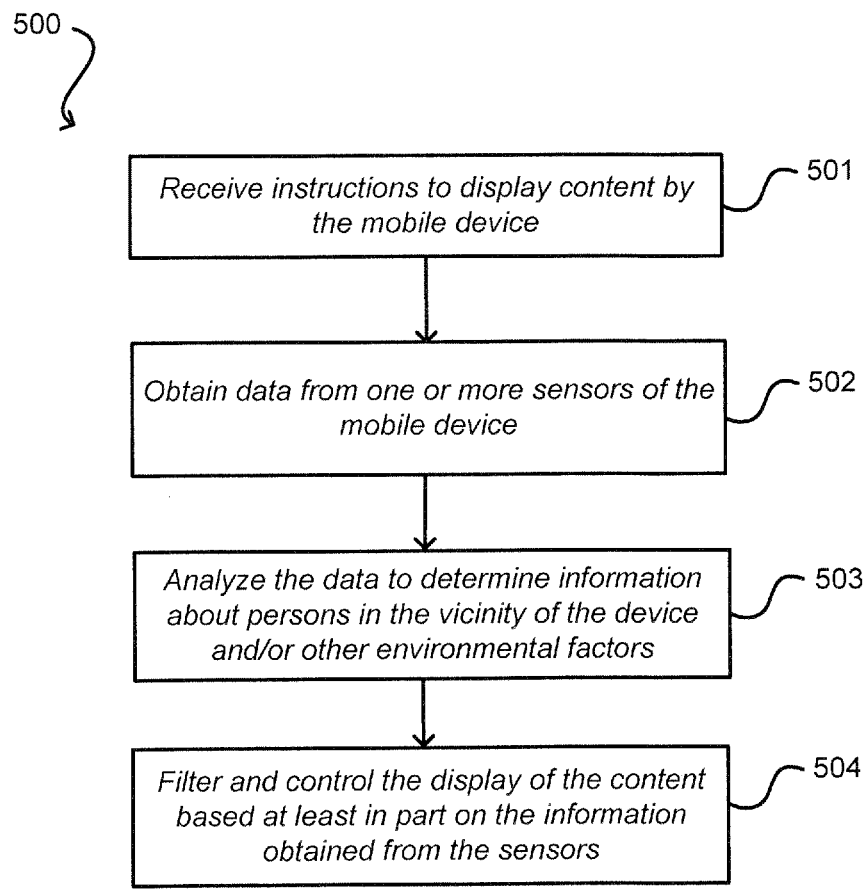
FIG. 5 illustrates an example process for controlling the presenting of media content based on environmental factors, in accordance with various embodiments.

FIG. 5 illustrates an example process 500 for controlling the presenting of media content based on environmental factors, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, a mobile computing device (e.g., cellphone, tablet computer, electronic reader) receives instructions to display content. The instructions can be received by the user activating a particular portion of the user interface of the device, by receiving an instruction programmatically from an application installed on the device or in another way. The content can include audio, video, images, ringtone or other content perceptible by a user.

In operation 502, the device obtains data from one or more sensors embedded in the device. For example, the device may obtain image data from one or more cameras, audio data from one or more microphones, location data from one or more location sensors (e.g., GPS receiver) and/or the like. In alternative embodiments, the mobile device obtains the data from another apparatus that is not embedded into the mobile device, such as by establishing communication with another computing device.

In operation 503, the device analyzes the data retrieved from the sensors in order to determine information about the persons within a predetermined vicinity of the device and/or other environmental factors. The determined information can include but is not limited to identification of persons within the vicinity of the device, identification of the location in which the device is located, time of day, or other situational awareness or appropriateness information.

In operation 504, the determined information is used to filter and control the display of content by the device. For example, the device may censor or skip portions of video and/or audio, turn off ringtones, secure personal documents, or otherwise adjust the rendering of content.

Figure 6:
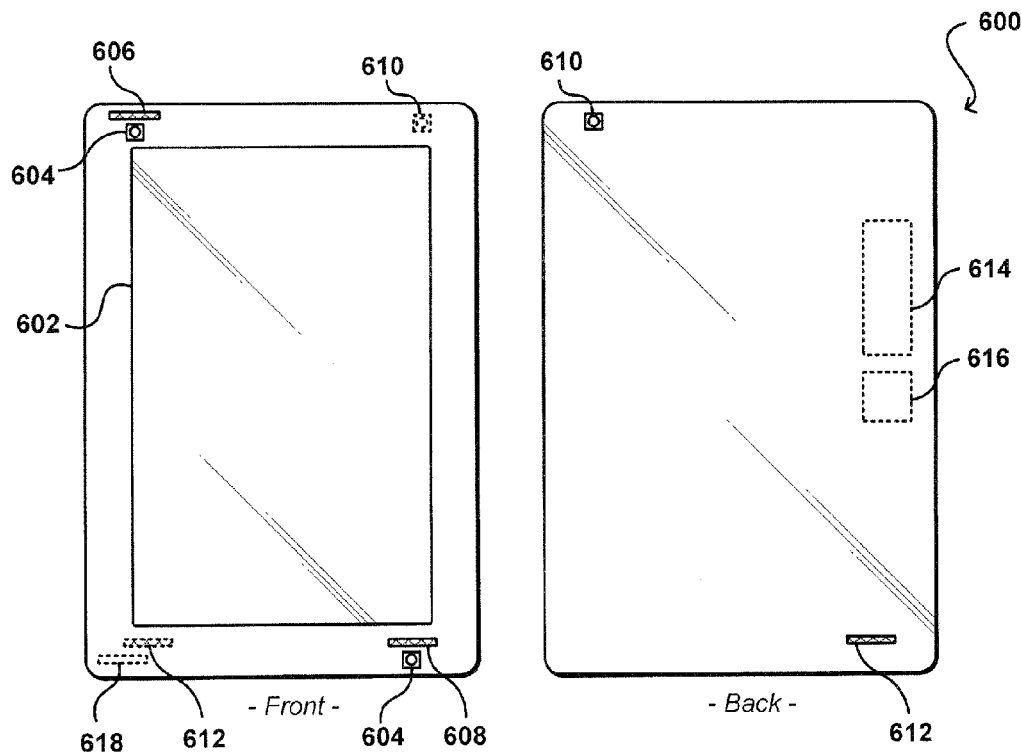
FIG. 6 illustrates front and back views of an example portable computing device that can be used in accordance with various embodiments.

FIG. 6 illustrates front and back views of an example portable computing device 600 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 600 has a display screen 602 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 604 on the "front" of the device and one image capture element 610 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least microphone(s) 606, 608, and/or 612 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 600 in this example also includes at least one motion or position determining element 618 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 614, such as may include at least one wired or wireless component operable to communicate with one or more portable computing devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
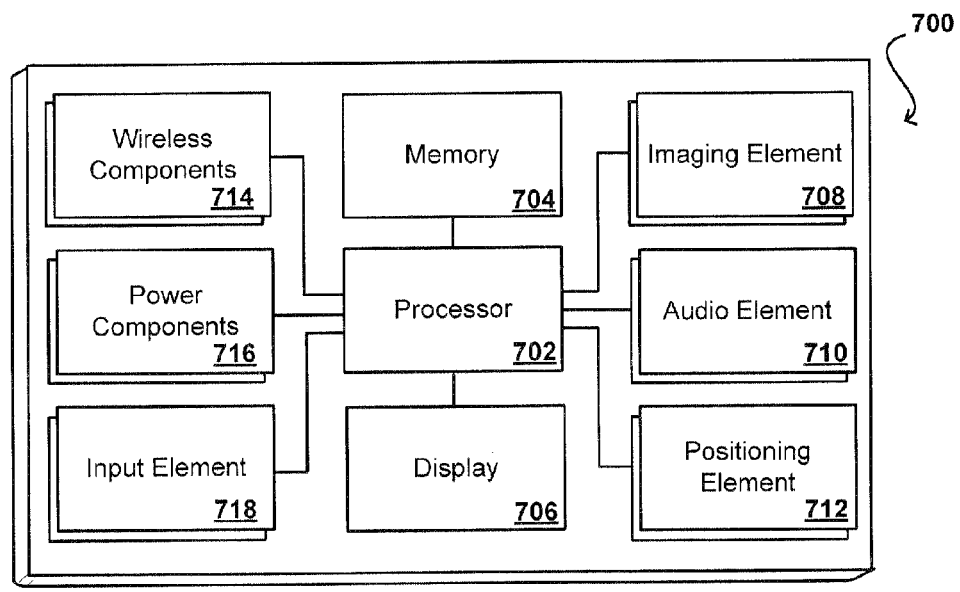
FIG. 7 illustrates an example set of basic components of a portable computing device, such as the device described with respect to FIG. 6.

In order to provide functionality such as that described with respect to FIG. 6, FIG. 7 illustrates an example set of basic components of a portable computing device 700, such as the device 600 described with respect to FIG. 6. In this example, the device includes at least one processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device typically will include some type of display element 706, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 708, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 712 that provides information such as a position, direction, motion, or orientation of the device. This positioning element 712 can include, for example, accelerometers, inertial sensors, electronic gyroscopes, electronic compasses, and GPS elements.

The device can include at least one additional input device 718 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 714 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a portable computing device, which can include capacitive charging elements for use with a power pad or similar device as discussed elsewhere herein. The example device also can include at least one touch and/or pressure sensitive element 718, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/ disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
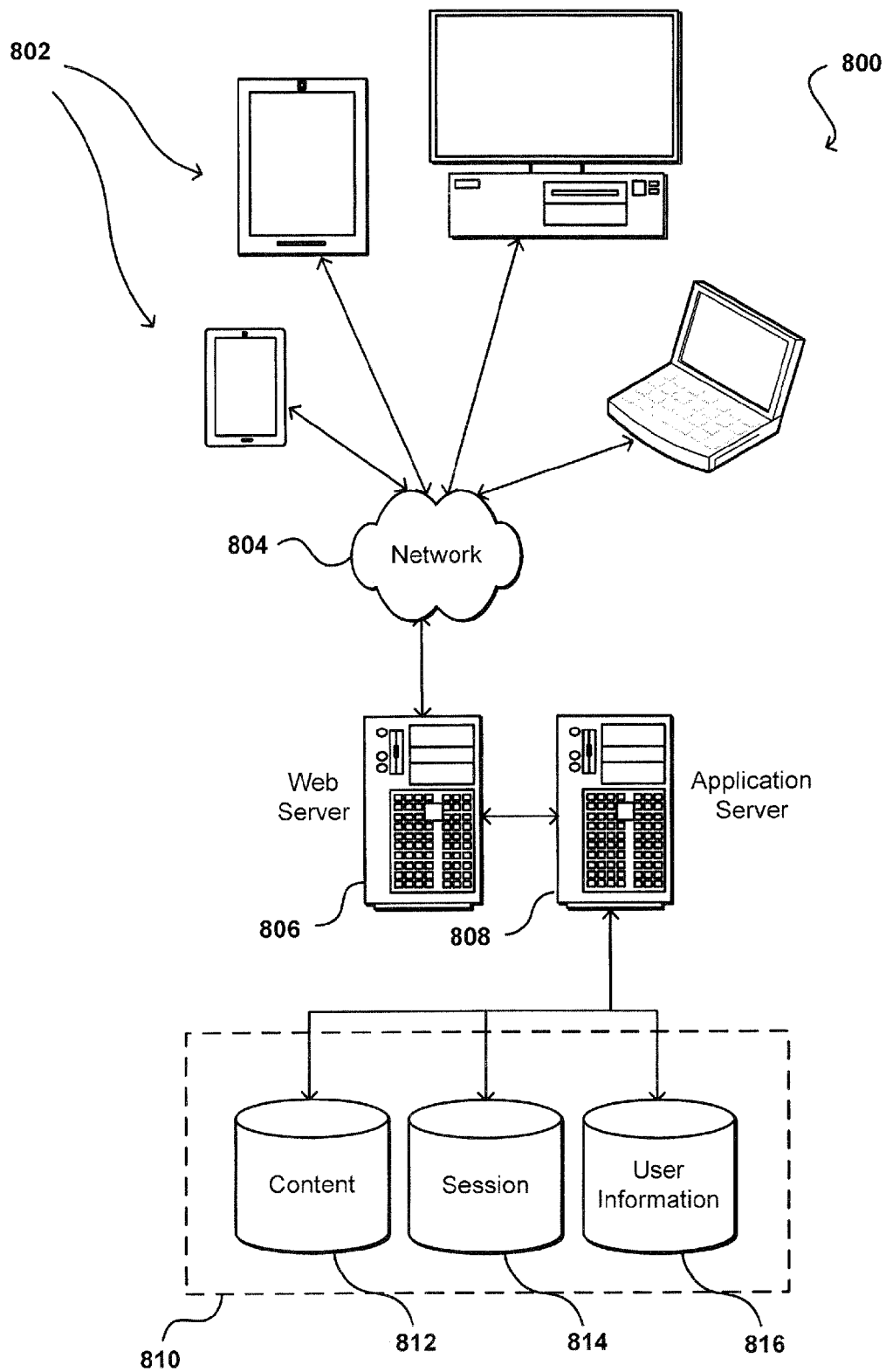
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for controlling content presentation, the method comprising:
    under the control of one or more computer systems configured with executable instructions,
    receiving an instruction to present media content by a computing device;
    receiving environment data by one or more sensors associated with the computing device, the environment data includes communication data representing communications by one or more devices associated with a person in proximity of the computing device;
    analyzing the environment data to determine a location of the computing device and an identity of the person in proximity of the computing device;
    determining adjusted content based at least in part on the media content and a profile associated with the identity; and
    causing presentation of the adjusted content on a display screen.

2. The computer-implemented method of claim 1, further comprising:
    preventing presentation of at least a portion of the media content on the display screen.

3. The computer-implemented method of claim 1, further comprising:
    causing presentation of at least one of video content, audio content, or image content.

4. A computer-implemented method, comprising:
    under the control of a computing device configured with executable instructions,
    receiving environment data by one or more sensors associated with the computing device, the environment data includes communication data by one or more devices associated with a person in proximity of the computing device;
    analyzing the environment data received by the one or more sensors to determine a location of the computing device and an identity of the person in proximity of the computing device;
    determining adjusted content based at least in part on a profile associated with the identity; and
    causing presentation of the adjusted content on a display screen.

5. The computer-implemented method of claim 4, further comprising:
    receiving an instruction to present media content;
    determining a portion of the media content is inappropriate based at least in part on the location of the computing device and the profile associated with the identity.

6. The computer-implemented method of claim 4, further comprising:
    determining the identity of the person in proximity of the location based at least in part on one or more of an image, a sound, or Global Positioning System coordinates (GPS).

7. The computer-implemented method of claim 4, further comprising:

determining adjusted content based at least in part on one or more restrictions for the media content indicated by the profile associated with the identity.

8. The computer-implemented method of claim 4, further comprising:
preventing presentation of at least a portion of media content on the display screen.

9. The computer-implemented method of claim 4, further comprising:
determining adjusted content based at least in part on at least one of an age of the person in proximity of the location or a disability of the person in proximity of the location.

10. The computer-implemented method of claim 4, further comprising:
receiving, by the computing device, an update to the profile associated with the identity; and
determining adjusted content based at least in part on the update to the profile associated with the identity.

11. The computer-implemented method of claim 4, further comprising:
causing presentation of at least one of video content, audio content, or image content.

12. The computer implemented method of claim 4, further comprising:
determining the person is no longer in proximity of the location of the computing device; and
causing presentation of default content on the display screen when the person is no longer in proximity of the location of the computing device.

13. A computing device, comprising:
one or more sensors capable of obtaining environment data;
at least one processor; and
memory including instructions that, when executed by the processor, cause the computing device to:
receive the environment data by the one or more sensors, the environment data includes communication data representing communications by one or more devices associated with a person in proximity of the computing device;
analyze the environment data from the one or more sensors to determine a location of the computing device and an identity of the person in proximity of the computing device;
determine adjusted content based at least in part on a profile associated with the identity; and
cause presentation of the adjusted content on a display screen.

14. The computing device of claim 13, wherein the instructions, when executed by the processor, cause the computing device to:
determine a portion of media content is inappropriate based at least in part on the location of the computing device and the profile associated with the identity.

15. The computing device of claim 13, wherein the one or more sensors include a global positioning system (GPS) sensor, wherein the instructions, when executed by the processor, cause the computing device to:
receive GPS sensor data including coordinates for the location of the computing device, wherein the environment data includes at least a portion of the GPS sensor data.

16. A non-transitory computer readable storage medium storing instructions, the instructions, when executed by one or more processors, cause the one or more processors to:
receive environment data from one or more sensors associated with the computing device, the environment data includes communication data representing communications by one or more devices associated with a person in proximity of the computing device;
analyze the environment data from the one or more sensors to determine a location of the computing device and an identity of the person in proximity of the location;
determine adjusted content based at least in part on a profile associated with the identity; and
cause presentation of the adjusted content on a display screen.

* * * * *